Oct. 13, 1970     M. McINTYRE     3,533,303
RIGHT ANGLE TRANSLATOR FOR REMOTE CONTROL REARVIEW MIRRORS
Filed Oct. 23, 1967     2 Sheets-Sheet 1

INVENTOR
MATTHEW (NMI) McINTYRE
BY
Miller Morriss Pappas & McLeod
ATTORNEYS

Oct. 13, 1970       M. McINTYRE       3,533,303
RIGHT ANGLE TRANSLATOR FOR REMOTE CONTROL REARVIEW MIRRORS
Filed Oct. 23, 1967                2 Sheets-Sheet 2

INVENTOR
MATTHEW (NMI) McINTYRE
BY
Miller Morriss Pappas & McLeod
ATTORNEYS

United States Patent Office 3,533,303
Patented Oct. 13, 1970

3,533,303
RIGHT ANGLE TRANSLATOR FOR REMOTE CONTROL REARVIEW MIRRORS
Matthew McIntyre, Jackson, Tenn., assignor to Jervis Corporation, Grandville, Mich., a corporation of Michigan
Filed Oct. 23, 1967, Ser. No. 677,395
Int. Cl. F16c 1/18; G05g 11/00
U.S. Cl. 74—501
4 Claims

ABSTRACT OF THE DISCLOSURE

A translator base for Bowden cable or wire operated remote control rearview mirror structures which provides sockets holding the cable sheaths under compression as between the actuator and the mirror element and which includes a plurality of separate rollers over which the wires or core member pass to connection with the universal actuator and/or the mirror structure so as to allow minimum clearance connections without friction difficulty in wire or cable core movement.

---

The present invention is an improvement in cable operated remote control devices of the type in which a universally movable actuator is connected by wire or core members to a remotely located element such as a mirror in such a manner that the mirror or actuated element mimics the universal movement imparted to the actuator. Such devices are particularly useful in automobiles because the operator of the automobile can control the externally mounted mirror from inside the vehicle and the sheathed cables or wires can be threaded in a hidden manner through the chassis, body, and/or frame. Such devices have gained considerable acceptance in the automotive industry. One difficulty is encountered, however, as exemplified in the instances in which the actuator is door mounted and the mirror element is also door mounted and extends externally of the vehicle. In such instances the cables extending from mirror and/or actuator are relatively short and an acute bend in the cable is necessary at the mirror housing and at the actuator. Such bends are made necessary for example because of the minimum clearance as between the outer door panel and the inner door facing. The result in such "close haul" situations is a pinch or link in the cable or core wire causing weakness, distortion, rupture of the sheath elements, high friction and ultimate early failure. Accordingly, the present invention is addressed to solving the problem posed by difficulty in such clearance restricted situations so that the core members make an entry to the actuator and/or mirror from the side and substantially at right angles to the axis of the actuator and/or mirror support structure. This is accomplished with reduction of clearance requirements and with substantial elimination of fatigue factors commonly attending an abrupt translation of direction in Bowden wire devices.

The general status of the art is best represented by reference to copending application Ser. No. 660,410 filed Aug. 14, 1967, now Pat. No. 3,444,754 issued May 20, 1969 entitled Remote Control Rearview Mirror directed to a structure in which the improvement of the present invention was first used. However, the United States Letters Patent 2,931,245, 3,030,821, 3,077,142, 3,057,262 and 3,094,582 are likewise directed to remote control mirror structures of the type in which the presently described structures are adaptable. In the French Pat. 387,-930 (Délivré, May 18, 1908) to Chantraine there appears a motion translator applied as intermediate an actuator and actuated element in a cable operated plural wire system, although not of the sheath type. In this French patent there appears no suggestion or means for applying a motion translator directly to the support casing of actuator or actuated structure.

Accordingly, the principal object of the present invention is to provide a minimum clearance motion translation structure for plural wire remote control devices such as mirrors.

Still another object is to provide a smoothly journalled transition in cable bends in avoidance of destruction of the cable or wire by repeated abrupt bending.

Still another object is to reduce friction at the point of motion transaltion in remote control cable core or wire operated systems.

Another and important object is to translate the motion of the core element or member at a point in the structure remote from the encasing sheath to avoid distortion of the sheath.

Other objects including simplicity of adaption to existing mirror control structures and ease of installation and repair in close space situations will be readily apparent as the description proceeds.

GENERAL DESCRIPTION

In general a base element is provided which is selectively secured to the actuator element or the actuated element in a cable operated remote control system. The base element is axially connected to the actuator or actuated element and is internally provided with pockets for guide rollers that are in substantially tangential alignment with wire or cable connectors in the motion translation mechanism of the actuator or actuated element. The base element includes sheath sockets which receive the sheath elements of the Bowden wire cables or wires in compression relation. The sockets are aligned with the circumference of the rollers which are usually, but not necessarily, at right angles to the line of tangency of the core element to the roller. With the sheaths set in the sockets the core elements pass over the rollers and extend at substantially right angles to the entry and through the base to connection with the actuator element or actuated element. This allows a right angle bend in the tensioned core over the circumference of the roller without attendant abrupt bending of the sheath and reduces friction on the core. Since the core elements are under tension the grooved rollers provide adequate direction control over the core elements and the base elements can be structurally integrated with the actuator element and the actuated element. The structure is adaptable to plural wire remote control structures and minimizes clearance requirements at both actuator element and actuated element by leading in the Bowden wire elements to the actuator and actuated elements at right angles to the axis of the mechanism therefor. Despite the small diameter of the rollers the wear factor on the core elements is materially reduced and overall performance is improved in "close" clearance installation.

IN THE DRAWINGS

SPECIFIC DESCRIPTION

Figure 1:
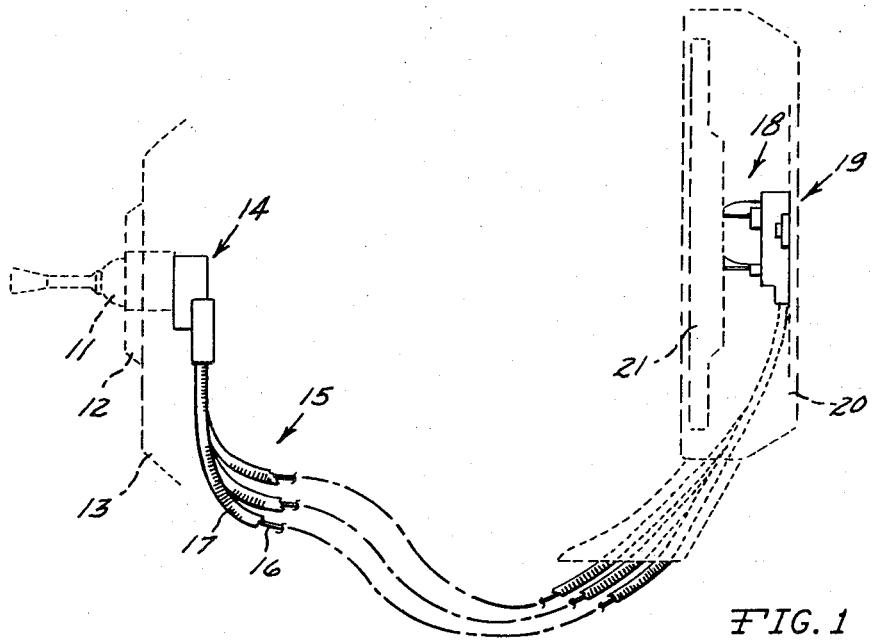
FIG. 1 is a side elevation view of a mirror (actuated) element and a mirror control (actuator) element in remote relation to each other and connected by plural Bowden (wire or cable core in sheath) wire assemblies and led into the actuator and actuated elements by the translator base of the present invention. The mirror element and actuator element are in phantom-line.

While primarily referenced to use in the context of a mirror element remotely controlled by an actuator, for example inside an automobile, the structure of the present invention is understood to be adaptable to any plural wire remote control Bowden wire or cable system as for example searchlights, manipulators, antenna controls and the like where remote control by mechanical means is desirable. In the FIG. 1 of the drawings there is shown at the actuator end, an actuator in phantom-line in substantial descriptive accord with application Ser. No. 660,410, Pat. No. 3,468,186 filed on Aug. 14, 1967. The escutcheon tube 12 secures the actuator 11 to a panel or dash board 13 which may in some instances be the interior panel of an automotive door. The translator element 14 of the present invention is secured to the actuator element 11 and becomes the base thereof and may be structurally integrated with the actuator mechanism as will be seen.

Bowden wire elements 15, each assembly comprising a core wire or cable 16 and a sheath 17, enter the translator element 14 at right angles to the axis of the actuator assembly 11 and likewise extend to the actuated mechanism (mirror end) 18. As shown, a translator 19 similar to the translator 14 may be located in the mirror case 20. Where such a translator structure 19 is used the Bowden wire or cable assemblies 15 enter the translator 19 at right angles to the pivot axis of the actuated element 18 and mirror 21. When the actuator 19 is applied to the actuated element 18 it can be immediately observed that the depth of the case 20 is thereby minimized and the design parameters of the case 20 are thus materially extended. The structural similarities between the translator 14 and 19 utilized at the actuator 11 and at the actuated element 18 will be clearly apparent as the description proceeds.

Figure 2:
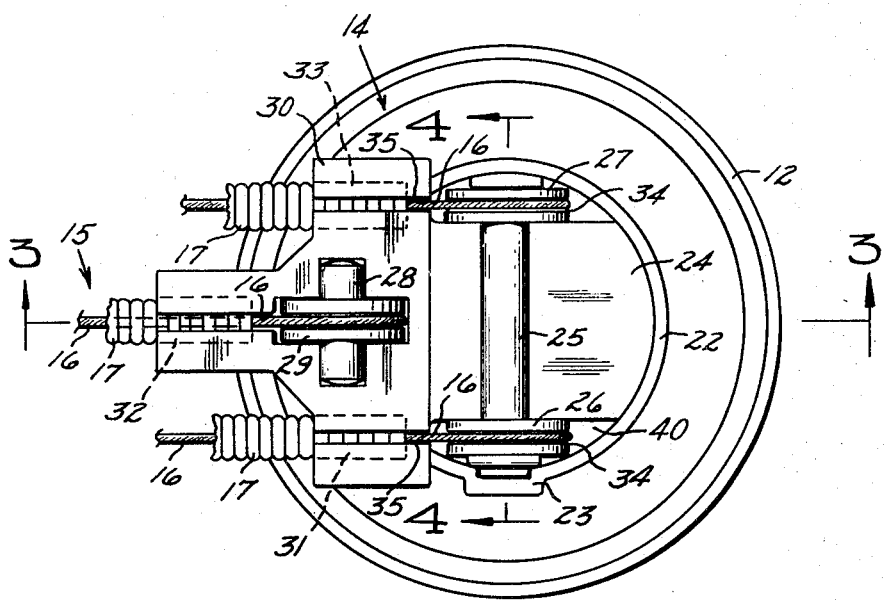
FIG. 2 is a bottom plan view of the translator base structure of the present invention as secured to the actuator element and indicating the positioning of the sheath sockets and rollers in a three wire system.

In FIG. 2 the translator 14 is viewed from the end of the actuator 11 opposite the control knob. The translator 14 is locationally secured inside the tubular escutcheon 12, the tubular body 22 is upset or keyed at 23 to receive the base element 24 of the translator 14. The base element 24 is preferably die cast to provide the recesses shown for receiving the pin axle 25 which provides a journal for the rollers 26 and 27, and the recess for receiving the pin axle 28 which provides a journal for the roller 29. The base element 24 includes a platform extension 30 to provide an entry block for the Bowden wire or cable assemblies 15. Sheath socket recesses 31, 32 and 33 are provided so that the axes of such entry recesses 31, 32 and 33 are in registering tangential alignment with the circumferential grooves 34 in the rollers 26, 27 and 29. Axial openings in the form of slots 35 are provided from recesses 31, 32 and 33 and through which the core wires or cables 16 extend. The terminal ends of the sheaths 17 are compressibly buttressed in the socket recesses 31, 32 and 33. The core wires or cables 17 thus pass over the rollers 26, 27 and 29 and are tangentially led away from the rollers 26, 27 and 29 to registering terminal connections in the actuator mechanism or, as will be seen, to the actuated mechanism.

Figure 3:
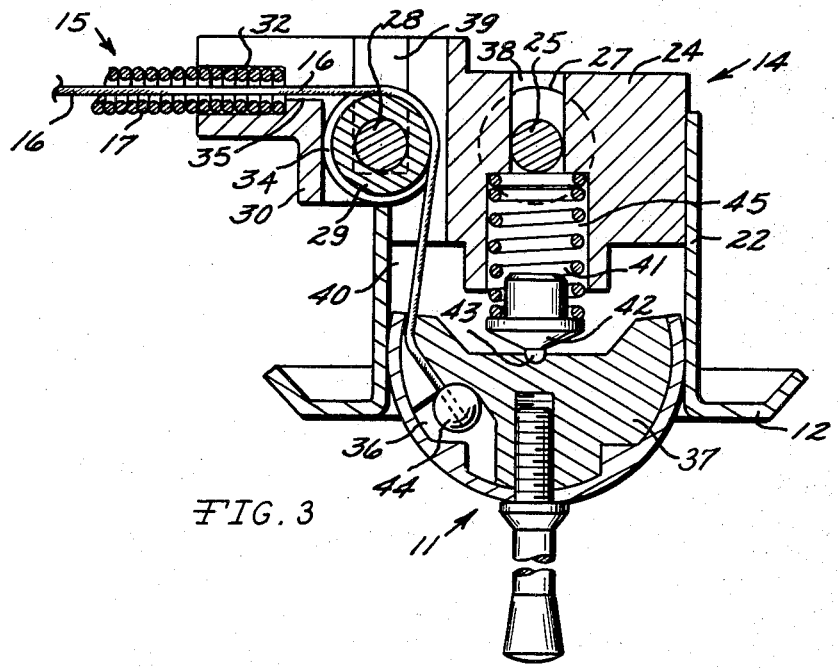
FIG. 3 is a cross section elevation view taken on the line 3—3 of FIG. 2 and indicating integration of the translator base structure in the actuator mechanism.

This is best understood by reference to FIG. 3 which indicates the relative profile position of rollers 27 and 29 and indicates how the core wire or cable 16 is passed over the roller 29, to terminal connectiton in the ball receiving recess 36 in the universally movable ball element 37 of the actuator element 11.

In a similar manner the core wire or cable elements 16 which pass over the rollers 26 and 27 are directed registrably downward (as shown in FIG. 3) to similar recesses like 36 in the ball element 37 of the actuator 11. If a three wire element control is involved the recesses 36 are provided at 120 degree intervals around the ball periphery. The axle pins 25 and 28 are seen seated in their slots 38 and 39, respectively, and are held in position by the tension in the core wires or cables 16. Passages 40 in the base element 24 provide free exit opening passage of the core wires or cables 16 to the actuator at right angles to their direction of entry to the sockets 31, 32 and 33.

In FIG. 3 it will be seen that the translator 14 also serves as a base receptacle for the coil spring 41 and its conical tipped follower 42. The rounded tip 43 of follower 42 engages the truncated base of the ball element 37 on the axis of the escutcheon tube 22 and thereby provides a resilient bias equally tensioning the core pieces 16 of the Bowden wire assemblies 15. Collaterally this applies compression in the sheath elements 17. Ball shaped ferrules 44 are secured to the terminal ends of the core pieces 16 to provide easy connection and disconnection to the control ball element 37 in the recess pockets 36.

To accommodate the spring 41, an axial spring pocket 45 is provided in the base element 24 which axially centers the spring 41 in the tubular escutcheon 22. The base element 24 may be modified to incorporate control elements as well as the translator roller mountings.

Figure 4:
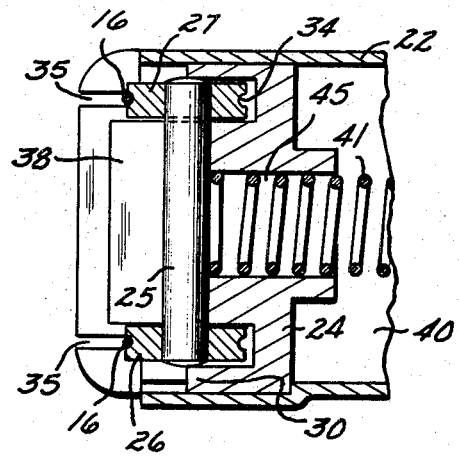
FIG. 4 is a partial cross section elevation view of the two rollers on a common shaft pin and taken on line 4—4 of FIG. 2.

In FIG. 4 the pin 25 carrying the rollers 26 and 27 is best revealed in the base element 24. In addition it is seen that the spring 41 is positioned by the base element 24 on the axis of the escutcheon tube 22.

Figure 5:
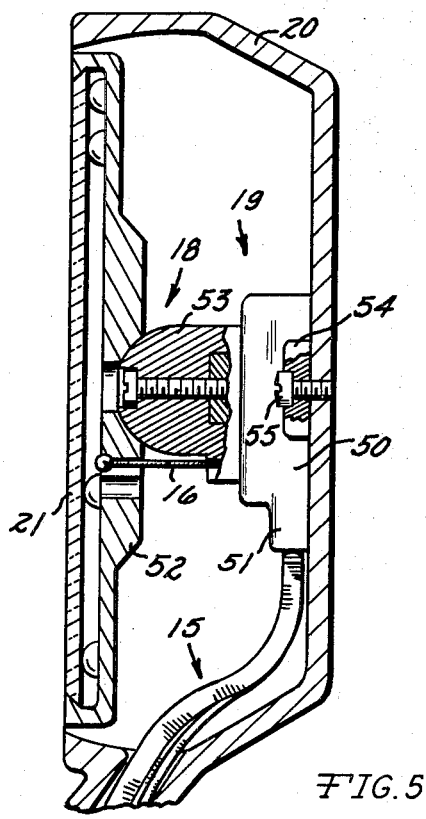
FIG. 5 is a somewhat schematic full section view through the actuated element (mirror end) and indicating the use of a translator base in accord with the present invention integrated with the pivot post and cut-away partially to indicate the limited universal movement of the actuated element (mirror).

In FIG. 5 the translator 19 is shown in the mirror case 20 at the actuated end of a remote control system. Rollers are provided in the base element 50 over which the core elements 16 are passed as described in FIG. 2, for example. The Bowden wire assemblies 15 are socketed in the socket boss platform extension 51 and the core elements extend into the base 50, over the rollers and are guided correspondingly to base element 24 to seat in the mirror receptacle 52. The tension in the cable or core elements 16 draw the receptacle into snug limited universal ball fit on the pedestal 53 which is secured to and in the translator 19. Hence the actuated mechanism including pivot pedestal 53 is integrated into the translator base and the core elements 16 are registrably and tangentially distributed from the translator 19 to the mirror receptacle 52 in operable relation. Connection of the translator 19 to the case is shown using extended mounting ears 54 and screws 55 therethrough. Brackets, rivets and other fasteners well known in the art are contemplated.

At both actuator and actuated ends the translators 14 and 19 provide a smooth transition by a right angle turn of the core elements 16 and thereby reduce clearance requirements and substantially extend the design parameters in such devices.

Having thus described my invention and a preferred embodiment thereof others skilled in the art will readily perceive improvements, modifications and adaptations thereof and such improvements, modifications and adaptations are intended to be included within the spirit of the invention limited only by the scope of the hereinafter appended claims.

I claim:

1. A motion translator structure attached selectively to the control or controlled end of tensioned Bowden wire type remote control rearview mirrors, comprising:
   a base member defining a plurality of roller cavities and sockets therein and having cable entry and exit openings therethrough, said entry and said exit openings being substantially at right angles to each other; and a roller journalled in each of said roller cavities in tangential alignment with said entry and exit openings and said sockets, said sockets each shouldering against the sheath member of a Bowden wire assembly and the cable core member of said Bowden wire assemblies trained over said rollers and tangentially passing through said exit openings.

2. A motion translator structure attached selectively to the control or controlled end of tensioned Bowden wire type remote control rearview mirrors, comprising:

a base member defining a plurality of roller cavities, entry and exit openings, sockets axially aligned with said entry openings, and said exit and said entry openings being at substantially right angles to each other;

a shaft in each of said cavities and removable therefrom in one direction;

a roller in each of said cavities and journalled on said shaft in each of said cavities and said rollers in tangential alignment with said entry and exit openings; and tensioned Bowden wire elements the sheath elements thereof bearing against said base at the sockets thereof and each of the core elements thereof extending through said entry and exit opening and over one of said rollers.

3. A motion translator structure for cable operated remote control actuation devices of the type in which tensioned Bowden wire assemblies are connected terminally to the control and controlled ends comprising:

an actuator;

an actuated member;

at least one Bowden wire assembly including sheath and core members terminally connected to said actuator and said actuated member;

a motion translator base connected to one of said actuator and actuated members and defining roller cavities, and having sockets bearing against said sheath members of said Bowden wire assemblies, and having entry openings registrable with said sockets and exit openings at substantially right angles to each other and through which said core members of said Bowden wire assemblies pass; and a roller in each of said roller cavities the roller surfaces tangentially aligned with said entry and exit openings, and said core members of said Bowden wire assemblies passing over said rollers and from said translator base through said exit opening.

4. The combination as set forth in claim 3 wherein a translator base structure as therein described is connected to each of said actuator and said actuated member.

References Cited

UNITED STATES PATENTS

| | | | |
|---|---|---|---|
| 2,931,245 | 4/1960 | Jacobson | 74—501 |
| 3,042,461 | 7/1962 | Smith. | |
| 3,094,582 | 6/1963 | Jacobson | 74—501 |
| 3,111,230 | 11/1963 | Pesenti | 74—501 X |
| 3,225,621 | 12/1965 | Augunas | 74—501 |
| 1,922,861 | 8/1933 | Pendergast | 74—10.7 |
| 3,286,545 | 11/1966 | Malachowski | 350—289 |
| 3,442,151 | 5/1969 | Brawner et al. | 74—501 |
| 3,444,754 | 5/1969 | Liedel | 74—501 |

FOREIGN PATENTS 1,000,350    8/1965    Great Britain.

FRED C. MATTERN, JR., Primary Examiner

CAROLYN F. GREEN, Assistant Examiner

U.S. Cl. X.R.

74—481